United States Patent [19]

Vasta

[11] 4,446,259
[45] May 1, 1984

[54] COATING COMPOSITION OF A BLEND OF A GLYCIDYL ACRYLIC POLYMER AND A REACTIVE POLYSILOXANE

[75] Inventor: Joseph A. Vasta, Wilmington, Del.

[73] Assignee: E. I. Du Pont de Nemours and Company, Wilmington, Del.

[21] Appl. No.: 430,840

[22] Filed: Sep. 30, 1982

[51] Int. Cl.³ ............... C08L 27/10; C08L 63/10; C08L 83/06
[52] U.S. Cl. ................... 523/408; 523/410; 523/435; 523/437; 524/506; 525/103
[58] Field of Search ............ 525/103; 523/410, 435, 523/437, 454, 457, 466, 408; 524/506

[56] References Cited

U.S. PATENT DOCUMENTS

| | | | |
|---|---|---|---|
| 3,002,764 | 11/1962 | Osdal et al. | 524/506 |
| 3,003,992 | 10/1961 | Mabrey et al. | 524/506 |
| 3,069,378 | 12/1962 | Prober et al. | 524/506 |
| 3,203,919 | 8/1965 | Brachman | 524/506 |
| 3,468,836 | 9/1969 | Sekmakas | 260/33.6 |
| 3,644,566 | 11/1970 | Kincheloe | 260/826 |
| 3,650,813 | 12/1969 | Nordstrom | 117/93.31 |
| 3,655,602 | 4/1972 | Sekmakas | 260/29.2 M |
| 4,265,801 | 5/1981 | Moody et al. | 525/103 |

OTHER PUBLICATIONS

Dow Corning Literature Article "Selection Guide to Silicone Paint Resins".

*Primary Examiner*—Allan Lieberman
*Attorney, Agent, or Firm*—Hilmar L. Fricke

[57] ABSTRACT

A coating composition having a liquid carrier and a binder of a blend of
a. an acrylic polymer containing glycidyl groups and
b. a crosslinkable polysiloxane having attached to the silicone atoms of its backbone alkyl groups, phenyl groups and hydroxyl groups;

optionally, a fluorocarbon polymer can be added to the composition;

the composition cures at ambient temperatures and provides a finish that is durable, weatherable and heat resistant and is particularly useful for coating pipes, tanks, vessels and stacks of plants and refineries that are subjected to weathering, chemicals and heat.

13 Claims, No Drawings

COATING COMPOSITION OF A BLEND OF A GLYCIDYL ACRYLIC POLYMER AND A REACTIVE POLYSILOXANE

BACKGROUND OF THE INVENTION

This invention relates to an ambient temperature curable coating composition which forms a durable, weatherable chemical and temperature resistant finish.

The prior art shows coating compositions of acrylic silicone copolymers which are crosslinked by heat or radiation after application to a substrate. Patents showing such compositions are as follows: Sekmakas, U.S. Pat. No. 3,468,836, issued Sept. 23, 1969, Kincheloe et al., U.S. Pat. No. 3,644,566 issued Feb. 22, 1972, Nordstrom et al., U.S. Pat. No. 3,650,813 issued Mar. 21, 1972 and Sekmakas U.S. Pat. No. 3,655,602 issued Apr. 11, 1972.

In the construction or repair of industrial chemical plants and oil refineries, coatings are applied to substrates such as pipes, stacks, tanks, reactors and the like. These coatings must be applied at ambient temperatures, provide protection to the substrate from moisture and weathering before the plant is placed in operation. After the plant is in operation, these coatings are subjected to chemicals and elevated temperature conditions of 100°-200° C. and above the coatings must remain intact and provide protection to the substrates at these elevated temperatures. The aforementioned prior art compositions are inadequate for the above purpose since these compositions must be heated to elevated temperatures or cured by radiation to form a durable coating. This would be impossible or very impractical for new plant construction where the plant would not be operational for a long period of time or in an old plant which generally is painted when the plant is not in operation.

There is a need for a coating composition that does not require curing at an elevated temperature but will cure at ambient temperatures to form a weatherable, durable and chemical resistant finish that will withstand high temperatures which occur during plant and refinery operations.

SUMMARY OF THE INVENTION

The coating composition contains about 10-80% by weight of a film-forming binder and 20-90% by weight of a liquid carrier; wherein the binder is a blend of about
 a. 20-90% by weight, based on the weight of the binder, of an acrylic polymer of about 10-50% by weight, based on the weight of the acrylic polymer, of polymerized glycidyl methacrylate or glycidyl acrylate and 50-90% by weight of other polymerized ethylenically unsaturated monomers such as alkyl methacrylates, alkyl acrylates, styrene or alkyl substituted styrenes; wherein the acrylic polymer has a weight average molecular weight of about 10,000-100,000 determined by gel permeation chromatography using polymethylmethacrylate as a standard and
 b. 10-80% by weight, based on the weight of the binder, of a crosslinkable polysiloxane having attached to silicone atoms of its backbone alkyl groups with 1-6 carbon atoms, phenyl groups and hydroxyl groups and containing sufficient hydroxyl groups to provide a silanol content of about 0.5-7% by weight, based on the weight of the polysiloxane.

DETAILED DESCRIPTION OF THE INVENTION

The coating composition contains about 10-80% by weight of a film forming binder and 20-90% by weight of a liquid carrier. Preferably, the composition contains 40-70% by weight of the film-forming binder and 30-60% by weight of the liquid carrier. Generally, the liquid carrier is an organic solvent for the binder. The carrier can be aqueous to form a dispersion or a blend of a nonsolvent and solvent for the binder to form a nonaqueous dispersion.

The binder of the composition is a blend of 20-90% by weight of an acrylic polymer and 10-80% by weight of a polysiloxane. Preferably, the composition contains about 50-75% by weight of the acrylic polymer and 25-50% by weight of the polysiloxane.

In general, the acrylic polymer must be compatible with the polysiloxane and contain a sufficient number of reactive groups, primarily glycidyl groups, to crosslink with the polysiloxane under ambient temperatures after the coating compositions has been applied to a substrate. The acrylic polymer should have a glass transition temperature of about 20° C. to 50° C. A number average molecular weight of about 2,000 to 20,000, a weight average molecular weight of about 10,000 to 100,000 and a molecular weight distribution of about 2 to 5.

The molecular weight of the acrylic polymer is determined by gel permeation chromatography using polymethylmethacrylate as a standard.

The glass transition temperature of the polymer is determined by differential scanning colorimetry or is calculated.

The acrylic polymer is prepared by conventional polymerization procedure in which monomers, catalyst and solvent are changed into a conventional polymerization vessel and reacted at about 60° to 175° C. for about 1-6 hours to form the polymer.

Typical solvents which are used to prepare the acrylic polymers are the following: toluene, ethyl acetate, acetone, methyl isobutyl ketone, methylethyl ketone, ethyl alcohol, mineral spirits, ethylene glycol monoethyl ether acetate, and other aliphatic, cycloaliphatic and aromatic hydrocarbon, esters, ethers, ketones and alcohols which are conveniently used.

About 0.1-4% by weight, based on the weight of the monomers, of the polymerization catalyst is used to prepare the acrylic polymer. Typical catalysts are: azo-bis-isobutyronitrile, azo-bis(gamma dimethyl valeronitrile), benzoyl peroxide, t-butyl pivalate and the like.

The acrylic polymer contains about 10-50% by weight of glycidyl methacrylate or glycidyl acrylate and 50-90% by weight of other ethylenically unsaturated monomers. Preferably, the acrylic polymer contains about 10-30% by weight of glycidyl methacrylate or glycidyl acrylate and 70-90% by weight of other ethylenically unsaturated monomers.

Typical ethylenically unsaturated monomers that are used to form the acrylic polymer are as follows: alkyl methacrylates having 1-12 carbon atoms such as methyl methacrylate, ethyl methacrylate, butyl methacrylate, hexyl methacrylate, 2-ethylhexyl methacrylate, nonyl methacrylate, lauryl methacrylate, cyclohexyl methacrylate, isodecyl methacrylate, propyl methacrylate, phenyl methacrylate, isobornyl methacrylate and the like; alkyl acrylates having 1-12 carbon atoms in the alkyl group such as methyl acrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, cyclohexyl acrylate, isodecyl acrylate, phenyl acrylate, isobornyl acrylate and the like; styrene, alkyl substituted styrene such as α-methyl styrene, t-butyl styrene, vinyl toluene.

One preferred acrylic polymer contains about 10–30% by weight of glycidyl methacrylate, 10–20% by weight of styrene, 50–60% by weight of butyl methacrylate and 5–20% by weight butyl acrylate. One particularly preferred acrylic polymer contains 20% by weight glycidyl methacrylate, 15% by weight styrene, 55% by weight butyl methacrylate and 10% by weight butyl acrylate.

The polysiloxane contains the following units

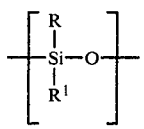

where R and $R^1$ are alkyl group having 1–6 carbon atom, phenyl group or hydroxyl group and contains sufficient number of hydroxyl groups to provide a silanol content of about 0.5–7% by weight. One preferred resin is Dow Corning's D.C. 840 silicone resin which formed by hydrolyzing selected amounts of mono, di and tri methyl chlorosilicone, mono, di and tri phenyl chlorosilicone, mono, di and tri propyl chlorosilicone and mono, di and tri amyl chloro-silicone and the resulting products are condensed to form a resin blend having a silanol content of about 1.9–3% by weight. Other polysiloxanes which give similar results are Bayer's "Baysilone" Resin P150K, Rhone-Poulenc's "Rhodorsil" 6406 X and General Electric's SR-165. These polysiloxanes are proprietary products but are believed to be formed as described above.

Generally, the composition contains pigments in a pigment to binder weight ratio of about 10/100 to 300/100. Often coatings formed from the composition are exposed to high temperatures and inorganic pigments are used such as metal oxides like titanium dioxide, iron oxide, and the like; metallic pigments such as aluminum flake, nickle flake and powdered aluminum; sulfates, silica, talc, and the like.

Trace amounts of multivalent metal ions of iron, aluminum, zinc and tin from the above pigments are present in the composition and co-ordinate with the silanol groups of the polysiloxane and catalyze the crosslinking reaction between the acrylic polymer and polysiloxane to provide ambient temperature curing of the coating composition after application to a substrate. If the metal ions complexed with the silanol groups are not present, elevated temperatures are required to cure the composition.

To insure stability of the coating composition during storage, compounds such as acetyl acetone are added in amounts of about 0.75–3% by weight. The acetyl acetone complexes with metal ions in the composition and prevents catalyzation of the crosslinking reaction during storage. Upon application the acetyl acetone volatilizes and allows the metal ions to complex with the silanol groups as described above and catalyze curing of the finish. Other auxiliary stabilizers can also be added such as glycidyloxy alkoxy silanes such as gamma-glycidoxy propyl trimethoxy silane.

The coating composition can be applied using conventional techniques such as spraying, brushing, roller coating, flow coating and the like and dried at ambient temperatures to give a finish about 1–5 mils thick. The composition can be applied to a wide variety of metal substrates such as iron, grit blasted steel or aluminum. Preferably, a primer of a polysilicate and inorganic zinc pigments is used. The resulting coating is durable, weatherable, has good adhesion to primed and unprimed substrates and is heat and chemical resistant. These characteristics make the composition particularly useful for painting pipes, tanks, stacks, and reactors of a chemical plant or refinery before the plant or refinery is placed in operation. The coating provides good protection from weathering before the plant or refinery is placed in operation and continues to provide good protection after the plant or refinery is placed in operation even when these coatings are exposed to elevated temperatures of typical processes.

Another aspect of this invention is the addition of up to 30% by weight, based on the weight of the binder, of a fluorocarbon polymer to the composition to improve flexibility of the resulting finish, improve chemical resistance and reduces the coefficient of friction of the finish. Generally, about 5–30% by weight of the fluorocarbon polymer is used. Typical fluorocarbon polymers that can be added are polyvinylidine fluoride, polytetrafluoroethylene, copolymers of tetrafluoroethylene and hexafluoropropylene, copolymers of ethylene and tetrafluoroethylene, copolymers of tetrafluoroethylene and perfluoropropyl vinyl ether and the like.

These fluorocarbon polymer containing compositions can be applied by any of the aforementioned techniques to any of the above substrates and then the resulting coating is baked at 200° to 345° C. for about 0.5 to 2 hours to provide a coating 1 to 3 mils thick. These coatings have good adhesion to substrates, good hardness and gloss, solvent resistance and have good weatherability, excellent heat resistance and low coefficient of friction.

These compositions can be used to coat typical smaller parts of a plant, refiniery or machinery that can be baked in an oven and are those parts that are exposed to high temperatures and often in combination with weathering.

When polytetrafluoroethylene is used in the composition, the resulting coating can be subjected to temperatures sufficiently high to oxidize the constituents of the coating and the polytetrafluoroethylene will fuse to form a coating that is adhered to substrate and is still durable and weatherable. This composition is particularly useful as a coating for surfaces requiring resistance to severe chemical exposure and provide low friction surface.

The following examples illustrate the invention. All parts and percentages are on a weight basis. Molecular weights are determined by gel permeation chromatography using polymethyl methacrylate as a standard.

EXAMPLE I

An acrylic polymer solution was prepared by charging the following constituents into a conventional polymerization vessel equipped with a stirrer, addition funnel, thermometer and a heating mantel:

|  | Parts by Weight |
| --- | --- |
| Portion 1 | |
| Toluene | 209.57 |
| Acetone | 64.48 |
| Styrene monomer | 66.49 |
| Butyl acrylate monomer | 44.33 |
| Butyl methacrylate monomer | 243.81 |
| Glycidyl methacrylate monomer | 88.66 |
| Portion 2 | |
| Azo-bis-isobutyronitrile | 4.43 |
| Toluene | 22.16 |
| Acetone | 22.16 |
| Portion 3 | |
| Azo-bis-isobutyronitrile | 2.22 |
| Toluene | 11.09 |
| Acetone | 11.09 |
| Portion 4 | |
| Azo-bis-isobutyronitrile | 2.22 |
| Toluene | 11.09 |
| Acetone | 11.09 |
| Total | 814.89 |

Portion 1 was charged into the polymerization vessel and heated to 85° C. and the heat was turned off. Portion 2 was added at a uniform rate over 30 minutes. During the addition, the temperature rose to about 95° C. After portion 2 was added, the resulting reaction mixture was held at its reflux temperature for 90 minutes and heating was continued to maintain 85° C. temperature. Portion 3 was added at a uniform rate over a 15 minute period and then the reaction mixture was held at its reflux temperature for 60 minutes. Portion 4 was added at a uniform rate over a 15 minute period and the reaction mixture was held at is reflux temperature for an additional 60 minutes.

The resulting acrylic polymer solution had a weight solids of 55%, the polymer contained about 15% styrene, 10% butyl acrylate, 55% butyl methacrylate, and 20% glycidyl methacrylate, had a number average molecular weight weight of 15,300, a weight average molecular weight of 42,400.

The following mill bases were prepared:

|  | Parts by Weight |
| --- | --- |
| Black Mill Base | |
| Acrylic Resin solution(prepared above) | 482.72 |
| Black Pigment(a mixture of chrome oxide, copper oxide magnesium oxide and molybdenum oxide) | 132.76 |
| Xylene | 265.52 |
| Total | 881.00 |
| White Mill Base | |
| Acrylic Resin solution(prepared above) | 397.46 |
| Titanium dioxide pigment | 655.15 |
| Xylene | 218.39 |
| Total | 1271.00 |
| Brown Mill Base | |
| Acrylic Resin solution(prepared above) | 479.43 |
| Golden Brown Pigment(Mixture of iron oxide, aluminum oxide and titanium dioxide) | 131.86 |
| Xylene | 263.81 |
| Total | 875.00 |

Each of the above mill bases was charged into a conventional sand mill and ground to form a uniform dispersion.

A black paint was prepared by mixing together the following constituents.

|  | Parts by Weight |
| --- | --- |
| Acrylic Resin solution (prepared above) | 334.90 |
| Dow Corning's D.C. 840 proprietary polysiloxane solution (believed to be 60% solids in toluene of a blend of polysiloxanes which are formed by the hydrolysis of select amounts of mono, di and tri methyl, propyl, amyl and phenyl chlorosilicones which are condensed to form a resin having a silanol content of about 1.9–3%.) | 198.42 |
| Gamma-glycidoxypropyl trimethoxysilane | 3.72 |
| Black mill base(prepared above) | 271.60 |
| Toluene | 6.07 |
| Methanol | 23.88 |
| Acetyl acetone | 8.34 |
| Total | 846.93 |

A tan paint was prepared by mixing together the following constituents:

|  | Parts by Weight |
| --- | --- |
| Acrylic Resin Solution (prepared above) | 205.93 |
| Polysiloxane Solution (described above) | 155.77 |
| Gamma-glycidoxypropyl trimethoxy silane | 3.12 |
| White Mill Base(prepared above) | 426.20 |
| Black Mill Base(prepared above) | 7.17 |
| Brown Mill Base(prepared above) | 125.87 |
| Methanol | 27.73 |
| Toluene | 21.50 |
| Acetyl acetone | 9.71 |
| Total | 983.00 |

A can of each of the above paints was stored in an oven at 60° C. for four weeks. The viscosity of the paint was measured after each week. There was no noticeable increase in the viscosity of the paints over the four week period indicating that the paints have good shelf life.

Each of the paints was sprayed onto a primed steel panel and allowed to dry at ambient temperatures. The resulting paint coatings were about 1.5–2.5 mils thick, had good resistance to bases such as sodium hydroxide and acids such as sulfuric acid, had acceptable gloss and appearance. Exposure of a panel to 80° C. increases film hardness to 14 knoops and resistance to solvents such as methyl ethyl ketone. The panels were exposed to a Q.U.V. accelerated weathering tester and after 1000 hours showed no loss of gloss or film integrity and after 2500 hours of exposure the coating on each panel was polished which brought the gloss back to an acceptable level.

Separate sets of steel panels were prepared as above. One set was exposed to 230° C. for an hour and a second set to 340° C. for one hour. The coatings on each of the panels discolored to an extent but did not craze, crack or peel and remained intact. These panels were resistant to a 50% caustic solution and a 50% acid solution after several days exposure.

EXAMPLE 2

The following coating compositions were prepared:

| | Parts by Weight |
|---|---|
| Composition 1 | |
| Acrylic Resin Solution(prepared in Example I) | 126.7 |
| Polysiloxanes Solution(described in Example I) | 35.9 |
| Polyvinylidene fluoride(powdered) | 30.0 |
| Titanium dioxide pigment | 50.0 |
| Methanol | 7.3 |
| n-Propanol | 7.3 |
| Toluene | 70.1 |
| Total | 327.3 |
| Composition 2 | |
| Acrylic Resin Solution(prepared in Example I) | 126.7 |
| Polysiloxane Solution(described in Example I) | 35.9 |
| Polytetrafluoroethylene (micropowder) | 30.0 |
| Titanium dioxide pigment | 50.0 |
| Methanol | 7.3 |
| n-Propanol | 7.3 |
| Toluene | 70.1 |
| Total | 327.3 |
| Composition 3 | |
| Acrylic Resin Solution (described in Example I) | 126.7 |
| Polysiloxane Solution (described in Example I) | 35.9 |
| Polymer of tetrafluorethylene/ perfluoropropylvinyl ether | 30.0 |
| Titanium dioxide pigment | 50.0 |
| Methanol | 7.3 |
| n-Propanol | 7.3 |
| Toluene | 70.1 |
| Total | 327.3 |
| Composition 4 | |
| Acrylic Resin Solution (described in Example 1) | 126.7 |
| Polysiloxane Solution (described in Example 1) | 35.9 |
| Ethylene/tetrafluoroethylene copolymer | 30.0 |
| Titanium dioxide pigment | 50.0 |
| Methanol | 7.3 |
| n-Propanol | 7.3 |
| Toluene | 70.1 |
| Total | 327.3 |
| Composition 5 | |
| Acrylic polymer solution (described in Example 1) | 126.7 |
| Polysiloxane Solution (described in Example 1) | 35.9 |
| Copolymer of tetrafluoro- ethylene and hexafluoropropylene | 30.0 |
| Titanium dioxide pigment | 50.0 |
| Methanol | 7.3 |
| n-Propanol | 7.3 |
| Toluene | 70.1 |
| Total | 327.3 |

Each of the compositions 1–5 were ground in a conventional ball mill to form a coating composition. Each composition was reduced to 55% weight solids by the addition of a mixture of methanol and propanol.

A can of each of the compositions was stored in an oven at 60° C. for four weeks as described in Example 1 and the viscosity of each was measured at weekly intervals. There was no noticeable increase in viscosity of any of the compositions over the four week period indicating that the compositions have a good shelf life.

Each of the compositions was sprayed into a primed steel panel and baked at 235° C. for 60 minutes. In each case, the resulting coating was about 1.5–2.5 mils thick, had good resistance to solvents such as methyl ethyl ketone, acceptable hardness and acceptable gloss and appearance.

The panels were exposed to Q.U.V. accelerated weathering tester and after 2500 hours exposure the coatings did not craze, crack or peel but did lose gloss.

Separate sets of steel panels were prepared as above. One set was exposed to 230° C. for an hour, a second set to 340° C. for an hour and a third set exposed to 455° C. for an hour. The coatings on the panels exposed to 230° C. and 340° C. discolored to an extent but did not craze, crack or peel and remained intact. The panels coated with compositions 1, 3, 4 and 5 exposed to 455° C. could be readily scraped off the panels but composition 2 containing polytetrafluoroethylene adhered to the panel.

I claim:

1. A coating composition comprising about 10–80% by weight of a film forming binder and 20–90% by weight of a liquid carrier selected from the group consisting of organic solvent for the binder, aqueous liquid or a blend of solvent and nonsolvent for the binder; wherein the binder consists essentially of a blend of about a. 20–90% by weight, based on the weight of the binder, of an acrylic polymer consisting essentially of about 10–50% by weight, based on the weight of the acrylic polymer, of polymerized glycidyl methacrylate or glycidyl acrylate and 50–90% by weight of other polymerized ethylenically unsaturated monomers selected from the group consisting of alkyl methacrylate having 1–12 carbon atoms, alkyl acrylate having 1–12 carbon atoms, styrene, alkyl substituted styrenes and mixtures thereof and wherein the acrylic polymer has a weight average molecular weight of about 10,000–100,000, a number average molecular weight of about 2,000–20,000 and a molecular weight distribution of about 2–5 and a glass transition temperature of about 20°–50° C.;

b. 10–80% by weight, based on the weight of the binder, of a crosslinkable polysiloxane having the following units:

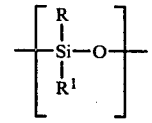

where R and R$^1$ are individually selected from the group consisting of alkyl group having 1–6 carbon atoms, hydroxyl group and phenyl group and contains sufficient hydroxyl groups to provide a silanol content of about 0.5–7% by weight.

2. The coating composition of claim 1 containing inorganic pigments in a pigment to binder weight ratio of about 10/100 to 300/100.

3. The coating composition of claim 1 containing 5 to 30% by weight, based on the weight of the binder, of a fluorocarbon polymer.

4. The coating composition of claim 3 in which the fluorocarbon polymer is polytetrafluoroethylene.

5. The coating composition of claim 3 in which the fluorocarbon polymer is a copolymer of tetrafluoroethylene and hexafluoropropylene.

6. The coating composition of claim 3 in which the fluorocarbon polymer is polyvinylidene fluoride.

7. The coating composition of claim 3 in which the fluorocarbon polymer is a copolymer of ethylene and tetrafluoroethylene.

8. The coating composition of claim 3 in which the fluorocarbon polymer is a copolymer of tetrafluoroethylene and perfluoropropyl vinyl ether.

9. The coating composition of claim 1 in which the acrylic polymer consists essentially of about
   10–30% by weight of glycidyl methacrylate,
   10–20% by weight of styrene,
   50–60% by weight of butyl methacrylate,
   5‘20% by weight of butyl acrylate.

10. The coating composition of claim 9 in which the acrylic polymer consists of
    20% by weight of glycidyl methacrylate,
    15% by weight styrene,
    55% by weight of butyl methacrylate and
    10% by weight of butyl acrylate.

11. The coating composition of claim 2 which comprises about 40–70% by weight of a film forming binder and 30–60% by weight of an organic solvent for the binder; in which the binder consists essentially of about
    a. 50–75% by weight, based on the weight of the binder, of an acrylic polymer consisting essentially of about
       (1) 10–30% by weight, based on the weight of the acrylic polymer, of glycidyl methacrylate,
       (2) 10–20% by weight, based on the weight of the acrylic polymer, of styrene,
       (3) 50–60% by weight, based on the weight of the acrylic polymer, of butyl methacrylate and
       (4) 5–20% by weight, based on the weight of the acrylic polymer of butyl acrylate and
    b. 25–50% by weight, based on the weight of the binder, of a polysiloxane having the following units:

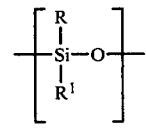

where R and $R^1$ are individually selected from the group consisting of methyl, propyl, amyl, hydroxyl and phenyl and the polysiloxane contains a sufficient number of hydroxyl groups to provide a silanol content of about 1.9–3.0%.

12. The coating composition of claim 2 containing about 0.75–3% by weight, based on the weight of the composition of acetyl acetone.

13. The coating composition of claim 12 containing an aluminum pigment.

* * * * *